Sept. 21, 1954   O. T. HAINKE   2,689,620
DRIVING ASSEMBLY FOR LAWN MOWERS
Filed Sept. 6, 1949   2 Sheets-Sheet 1

INVENTOR.
Oscar T. Hainke
BY
ATTORNEY.

Sept. 21, 1954 O. T. HAINKE 2,689,620
DRIVING ASSEMBLY FOR LAWN MOWERS
Filed Sept. 6, 1949 2 Sheets-Sheet 2
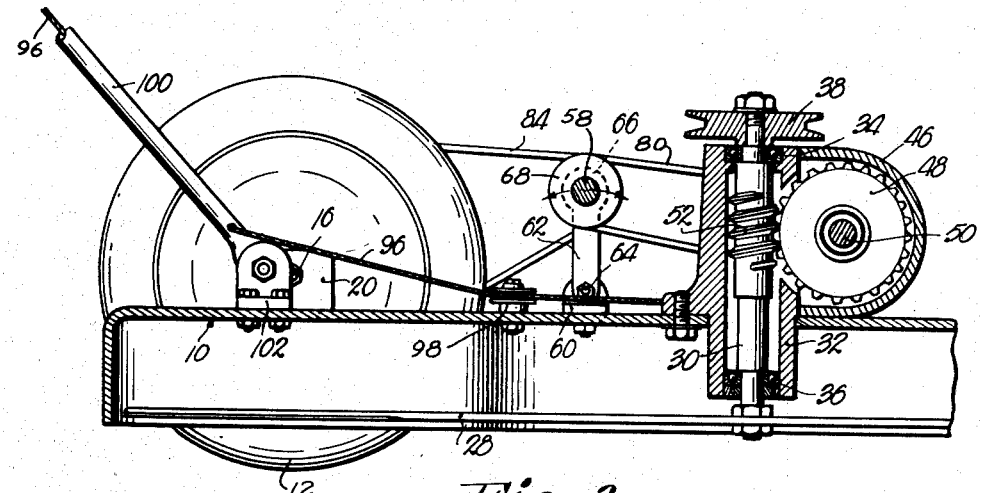
Fig. 3.
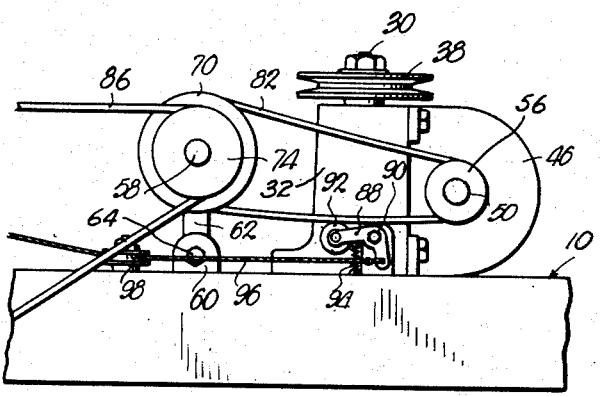
Fig. 4.
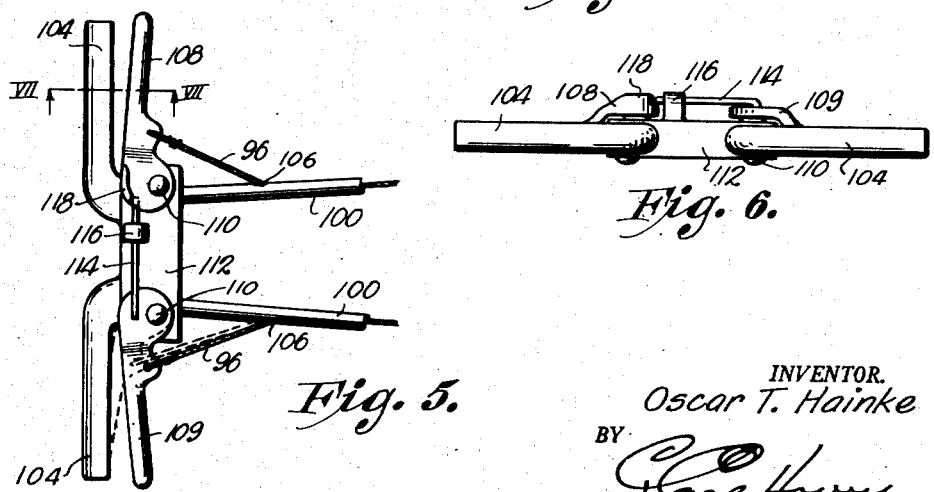
Fig. 5.
Fig. 6.
INVENTOR.
Oscar T. Hainke
BY
ATTORNEY.

Patented Sept. 21, 1954

2,689,620

UNITED STATES PATENT OFFICE 2,689,620

DRIVING ASSEMBLY FOR LAWN MOWERS

Oscar T. Hainke, Enid, Okla.

Application September 6, 1949, Serial No. 114,132

4 Claims. (Cl. 180—19)

This invention relates to mowing machines and particularly lawn mowers of the kind having a cutter blade underlying a horizontal frame and rotatable on a vertical axis, the primary object being to provide structure interconnecting said vertical rotatable cutter blade spindle with one or more of the supporting wheels for the mowing machine whereby to impart forward movement to the mower along the surface of the lawn to be cut.

It is the most important object of the present invention to provide a lawn mower of the kind above mentioned having a train of gears operably connected to the cutter blade spindle and in turn operably connected with supporting wheels of the mower, there being manually manipulable structure connected with the assembly of parts between the supporting wheels and the train of gears operable as a clutch in stopping and starting the mower as desired and additionally, in driving the mower forwardly at differing selected speeds.

Another object of the present invention is to provide driving mechanism for lawn mowers having a horizontal idler shaft interposed between the vertical cutter blade spindle and the normal horizontal axis of the supporting wheels and operably interconnecting such wheels with the spindle, said idler shaft being swingable toward and from the spindle whereby to permit loosening and tightening of one or more of the drive belts, thereby presenting a clutch and further permitting driving of the mower at differing speeds.

A still further object of the present invention is to provide a driving assembly that includes a worm formed on the cutter blade spindle and a gear in mesh therewith, there being a horizontal stub shaft on such gear, a pair of sheaves on the stub shaft as well as on the above mentioned idler shaft, which sheaves are interconnected by a pair of endless belts.

A further object of the present invention is to provide pulleys on the idler shaft and on a pair of the supporting wheels of the mower interconnected by endless belts, all to the end that when one of the belts is tightened, the idler shaft will swing to a position tightening the belts that join with the supporting wheels, there being a differential in diameters of the sheaves whereby upon tightening of one belt will drive the mower at one speed and tightening of another belt will drive the mower at another speed.

Other important objects will be made clear or become apparent as the following specification progresses, reference being had to the accompanying drawings, wherein:

Fig. 3 is a vertical substantially central fragmentary, cross-sectional view taken on line III—III of Fig. 1.

Fig. 4 is a fragmentary, enlarged side elevational view similar to that illustrated in Fig. 2.

Fig. 5 is a fragmentary top plan view of the outermost free end of the handle bars of the mowing machine.

Fig. 6 is an end view of such handle bars; and

Figure 1:
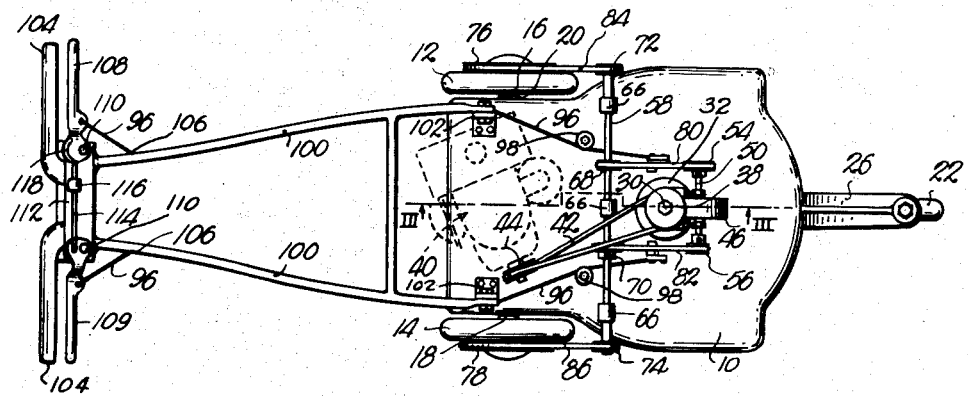
Fig. 1 is a top plan view of a driving assembly of a lawn mower having a driving assembly therefor, made in accordance with the present invention.
Figure 7:
Fig. 7 is a detailed, transverse, cross-sectional view taken on line VII—VII of Fig. 5.
Figure 2:
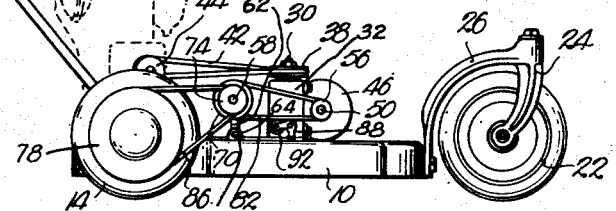
Fig. 2 is a side elevational view thereof.

It is generally well known that lawn mowers of the kind having a cutter blade mounted for rotation on a vertical axis as distinguished from the helical-type of lawn mower, have in recent years particularly become quite popular. For the most part such lawn mowers have been self-motivating from the standpoint that the operator must push the same along as the cutter blade is driven through use of a suitable prime mover. Those experienced in the field are aware of the fact that the reason such mowers are usually moved by hand is because of the difficulty arising in providing suitable driving means for the supporting wheels and inclusion of a satisfactory clutch that is inexpensive, easily operated and not likely to cause difficulty after short periods of use.

It is contemplated by this invention therefore, to provide a simple, inexpensive, efficient and long-lasting motivating means for such type of lawn mowers and to utilize the same prime mover as is now provided to actuate the cutter blade itself.

The lawn mower chosen for illustration includes a substantially horizontal platform broadly designated by the numeral 10, that is supported by a pair of opposed wheels 12 and 14 that may or may not, as desired, have a common axle. In the instance illustrated, the axes of rotation of wheels 12 and 14 are horizontal and in alignment, there being stub axles 16 and 18 for wheels 12 and 14 respectively. Such axles are secured to the platform 10 in any suitable manner such as by use of a bracket 20.

Platform 10 is additionally supported at the normally forwardmost end thereof by a single caster wheel 22 provided with a revolvable fork 24 that is in turn mounted upon a forwardly and upwardly extending bracket 26 on the forwardmost end of the platform 10.

An elongated, horizontally disposed cutter blade 28 is disposed below the platform 10 and mounted on the lowermost end of a vertical spindle 30 that extends through a tubular housing 32 mounted on the platform 10.

As is clear in Fig. 3 of the drawings, housing 32 extends below and above platform 10 and is bolted rigidly thereto. Suitable bearings 34 and 36 at the uppermost and lowermost ends respectively of the housing 32, rotatably receive the spindle 30. The uppermost end of spindle 30 that projects above housing 32 carries pulley 38 that is in turn connected with a suitable prime mover broadly designated by the numeral 40 and mounted upon the uppermost face of platform 10.

A twisted endless belt 42 is trained about the pulley 38 and about a pulley 44 on the drive shaft of prime mover 40. It is through such interconnection that spindle 30 and cutter blade 28 secured rigidly thereto, are rotated upon operation of the prime mover 40.

The improvements forming the subject matter of this invention relate to the way in which prime mover 40 is utilized to drive the two wheels 12 and 14 through the rotating spindle 30. Such improvements include a secondary housing 46 affixed directly to the housing 32 and communicating therewith above platform 10. Secondary housing 46 contains a gear 48 mounted on a horizontal stub shaft 50 disposed forwardly of the spindle 30 and above platform 10. The teeth of the gear 48 are constantly in mesh with a worm 52 formed on the spindle 30 within housing 32 above platform 10. The ends of the stub shaft 50 extend outwardly beyond the confines of housing 46 as is clear in Fig. 1, and carry a pair of sheaves 54 and 56 respectively.

An elongated, horizontally disposed idler shaft 58 is mounted on platform 10 in spaced relationship to the uppermost face thereof and in substantial parallelism with stub shaft 50 through the medium of a number of upstanding brackets 60 on the platform 10. Each bracket 60 is in turn provided with an elongated arm 62 pivotally secured to bracket 60 at the lowermost end of arm 62 as at 64. The uppermost end of the arms 62 are each provided with a bearing 66 for rotatably receiving the elongated idler shaft 58.

It is noted that the idler shaft 58 is located between the spindle 30 and the wheels 12 and 14 and terminates at its ends in a plane with the outermost faces of the wheels 12 and 14. The idler shaft 58 is provided with a pair of sheaves 68 and 70 in alignment with the sheaves 54 and 56 respectively on stub shaft 50. The outermost ends of the shaft 58 are also provided with a pair of pulleys 72 and 74. Likewise, the wheels 12 and 14 are provided with pulleys 76 and 78 respectively and secured rigidly to the outermost faces of such wheels 12 and 14.

Sheaves 54 and 68 are connected by an endless belt 80 and sheaves 56 and 70 are joined by an endless belt 82. Likewise, endless belt 84 is trained about pulleys 72 and 76 and an endless belt 86 joins pulleys 74 and 78. It is contemplated that sheaves 54 and 70 be of substantially the same diameter and that sheaves 56 and 68 likewise be of identical diameter but that sheaves 54 and 70 have diameters greater than that of the sheaves 56 and 68. Such arrangement or equivalent differential in sizes of such sheaves is provided to permit driving of the lawn mower at differing speeds as will hereinafter be made more clear. It is preferable that the pulleys 72 and 74 be of the same diameter and that likewise pulleys 76 and 78 be the same since irrespective of the speed of the lawn mower, both wheels 12 and 14 should be positively driven. Each of the belts 80 and 82 is provided with a tightening means that includes an L-shaped lever 88 pivotally mounted on platform 10 as at 90 and having a roller 92 on one end thereof in direct underlying relationship to its respective belt 80 or 82, as the case may be.

A spring 94 interconnecting the lever 88 and the platform 10 on one side of the pivotal connection 90, yieldably holds the roller 92 out of operative engagement with the corresponding belt 80 or 82. Each lever 88 has a cable 96 connected therewith and extending horizontally along the uppermost face of platform 10 over a pulley 98 and thence upwardly and rearwardly into a corresponding handle bar section 100.

As is clear in Fig. 1 of the drawing, the handle bar for the mower is provided with a pair of the elongated tubular sections 100 that have their lowermost ends secured to brackets 102 on the platform 10 adjacent the wheels 12 and 14. The uppermost and rearmost free ends of the sections 100 are provided with laterally and oppositely extending hand-grips 104 in the usual manner. The cables 96 pass from the respective tubular handle bar sections 100 by means of an opening 106 provided therein near the hand-grips 104. The hand-grips 104 are provided with triggers 108 and 109 substantially coextensive in length therewith and pivotally mounted as at 110 on a cross plate 112 that joins the uppermost ends of the handle bar sections 100. The uppermost ends of the cables 96 are tied to the corresponding triggers 108 and 109 intermediate the ends of the latter as is clear in Fig. 5. It is seen that the triggers 108—109 are movable toward and away from the hand-grips 104 and that when such action is imparted to the triggers 108—109, the corresponding cable 96 is moved to in turn impart swinging movement to the corresponding lever 88.

The trigger 109 has an elongated rod 114 pivotally secured thereto and extending in overlying relationship to the plate 112 and guided by a small bearing 116 on plate 112. That end of the rod 114 opposite to trigger 109 terminates in close proximity to the trigger 108 and trigger 108 is in turn provided with an upstanding boss 118 adjacent the pivotal connection 110 and adjacent the rod 114. Thus, when the trigger 108 is in the inoperative position shown in Fig. 5 of the drawings, trigger 109 can be moved toward its corresponding hand-grip 104 as indicated in dotted lines, and the pin 114 will clear boss 118. When trigger 109 is in the dotted-line position shown in Fig. 5, trigger 108 cannot be moved toward its hand-grip 104 because of the boss 118 striking the proximal end of pin 114. Conversely, when the trigger 109 is in the position shown in full lines in Fig. 5, trigger 108 can be moved toward its hand-grip 104 because of the fact that rod 114 is clear of the boss 118. However, after trigger 108 has been moved toward hand-grip 104, the boss 118 will move to a position overlying the proximal end of rod 114 and thereby prevent movement of trigger 109 toward its hand-grip 104.

In operation, when the triggers 108 and 109 are in the inoperative position shown in full lines in Fig. 5, and as shown in Fig. 1, the prime mover 40 may be placed in operation to drive the spindle 30 and its cutter blade 28 while the mower remains stationary. As soon as the operator desires to have the mower move along the grass to be cut, he grasps the trigger 108 or the trigger 109 and moves the same toward its corresponding hand-grip 104. Assuming that the trigger 109 has been thus actuated, its cable 96 will move roller 92 into engagement with the lowermost stretch of belt 82, thereby tightening the same with respect to sheaves 56 and 70. As belt 82 is thus tightened, the idler shaft 58 will swing toward the spindle 30 because of the pivotal connection between arm 62 and brackets 60. Such swinging movement as indicated by the arrow in Fig. 3 of idler shaft 58 will tension the belts 84 and 86 with respect to their corresponding pulleys 72—76 and 74—78 respectively.

As a result of such tightening of the belts 84 and 86, the prime mover 40 will drive wheels 12 and 14 at a predetermined speed as determined by the sizes of sheaves 56 and 70. Roller 92 corresponding to the trigger 109 will hold belt 82 tight with respect to sheaves 56 and 70 but the roller 92 corresponding to trigger 108, will be out of operative engagement with belt 80.

Consequently, while stub shaft 50 continues to drive the sheave 54, no rotative action will be imparted from sheave 54 to idler shaft 58 through belt 80 and sheave 68. In the event the operator desires to move the lawn mower at a differing speed, trigger 109 is released and trigger 108 is moved toward its hand-grip 104 in the same manner. During such operation, the sheaves 54 and 68, as well as belt 80, operate to rotate the idler shaft 58 instead of the sheaves 56 and 70 and belt 82. Because of the differing diameter of sheave 54 with respect to sheave 56 and sheave 68 with respect to sheave 70, two speeds are selectively possible according to the desires of the operator. In each case, the stub shaft 50 drives the idler shaft 58 and this last mentioned shaft in turn drives the two wheels 12 and 14 and it is seen that in each speed, both belts 84 and 86 cooperate to drive the corresponding wheels 12 and 14 and thereby to motivate the mower over the lawn being cut.

Through use of the rod 114 as above described, it is impossible for the operator to bring both belts 80 and 82 into operation at the same time and because of the convenient location of triggers 108 and 109, the operator can start and stop the mower quickly and easily as desired and can change from one speed to another speed without loss of time or without any adjustments whatsoever in the component parts of the machine.

At standstill, with both handles 108 and 109 spaced away from the grips 104, as shown in Figs. 1 and 5 of the drawings, cables 96 are slack and the two pulleys 92 are pulled downwardly by the action of springs 94, whereby both belts 80 and 82 are slack as shown in Fig. 4 of the drawings. Under such conditions, if prime mover 40 is operating to drive the spindle 30 and, therefore, the cutter 28, shaft 50 will rotate idly and pulleys 54 and 56 will rotate and slide with respect to their belts 80 and 82 respectively.

If handle 109 is drawn toward the proximal grip 104 as shown by dotted lines in Fig. 5 of the drawings, exerting a pull on its corresponding cable 96, the lever 88 beneath belt 82 will move upwardly, tightening belt 82 between pulleys 56 and 70, thereby swinging the idler shaft 58 toward the housing 32 on pivots 64 and tightening the belts 84 and 86 so that both wheels 12 and 14 will be driven by shaft 50 through pulley 56, belt 82, pulley 70, shaft 58, pulleys 72 and 74, belts 84 and 86, and pulleys 76 and 78.

Because of the locking means that includes rod 114, the handle 108 cannot at this time be simultaneously retracted toward its proximal grip 104 and, accordingly, the other roller 92 remains biased toward the platform 10 by its spring 94, and the belt 80 remains loose. Such looseness is enhanced by the fact that the shaft 58 is swung toward the housing 32 as aforesaid by the taut condition of belt 82.

The shaft 58 does not pivot or swing on its transverse axis and, therefore, as the tightening of belt 82 tends to swing the shaft 58 toward the housing 32, both belts 84 and 86 will be tightened and pulley 72 will not swing toward the pulley 76 to tighten the belt 80. By virtue of the differential in pulley sizes, namely, pulleys 54, 56, 68 and 70, the forward speed of the mower will depend upon which of the two belts 80—82 is tightened, and is operating to motivate ground wheels 12 and 14. It must be stressed that belts 80 and 82 cannot operate simultaneously, and that one is completely slack when the other is taut so that there is no tendency to advance the mower at two different speeds simultaneously.

It is apparent from the foregoing that an effective and efficient means of utilizing the vertical cutter blade spindle 30 in driving wheels 12 and 14 has been provided. Additionally, a clutch that is not likely to need repair or become inoperative in any manner whatsoever in extended periods of use, has been provided. The same prime mover that is used to drive spindle 30 is utilized to motivate the mower over the lawn and finally, the important feature with respect to the fingertip control and its means to prevent simultaneous driving of both belts 80 and 82 are significant features of the present invention.

Many advantages will emanate from use of a lawn mower of the kind herein illustrated and described and it is apparent that the long felt need for means to move lawn mowers of this character over the lawn, has been provided for in the structure herein disclosed.

Having thus described the invention, what is claimed as new and desired to be secured by Letters Patent is:

1. In a mobile mowing machine having a pair of spaced supporting wheels rotatable on a common horizontal axis, and a vertical cutter blade spindle; a horizontal stub shaft rotatably mounted on said machine; a train of gears operably connecting said spindle and said horizontal stub shaft; a horizontal idler shaft rotatably mounted on said machine in parallel relation to said stub shaft; a first pair of pulleys secured in spaced relation on said idler shaft; a first pair of sheaves secured in spaced relation on said idler shaft; a second pair of sheaves secured in spaced relation on said stub shaft, the diameter of at least one of said sheaves on said idler shaft being different from the diameter of the corresponding sheave on said stub shaft; a second pair of pulleys, each pulley of said second pair being operably connected to a corresponding one of said wheels; a pair of endless belts, each belt of said pair being loosely entrained about corresponding sheaves on said idler and stub shafts; a pair of endless bands, each band of said pair being entrained about corresponding pulleys on said idler shaft and said wheels; first and second means, each pivotally secured to said machine and engageable with a corresponding belt for varying the tension thereof; separate manual control structure mounted on said machine for each of said first and second means for selectively controlling either said first or second means, whereby to selectively tension the corresponding belt and to thereby drive said idler shaft and said wheels at a selected speed.

2. In the invention as set forth in claim 1, wherein the idler shaft is between the pulleys on the wheels and the stub shaft, and wherein the idler shaft is mounted for swinging movement toward and away from the stub shaft, whereby when either belt is tensioned the idler shaft will be swung toward the stub shaft to loosen the other belt and tension both bands.

3. In a mobile mowing machine having at least one supporting wheel, and a prime mover; a horizontal stub shaft rotatably mounted on said machine; mechanism operably connecting said prime mover and said horizontal stub shaft; a horizontal idler shaft rotatably mounted on said machine in parallel relation to said stub shaft; a pulley secured on said idler shaft; a first pair of sheaves secured in spaced relation on said idler shaft; a second pair of sheaves secured in spaced relation on said stub shaft, the diameter of at least one of said sheaves on said idler shaft being different from the diameter of the corresponding sheave on said stub shaft; wheel driving means operably connecting said pulley with said wheel; a pair of endless belts, each belt of said pair being loosely entrained about corresponding sheaves on said idler and stub shafts; first and second means, each pivotally secured to said machine and engageable with a corresponding belt for varying the tension thereof; separate manual control structure mounted on said machine for each of said first and second means for selectively controlling either said first or second means, whereby to selectively tension the corresponding belt and to thereby drive said idler shaft and said wheel at a selected speed.

4. In the invention as set forth in claim 3, wherein said wheel driving means comprises a second pulley operably connected to said wheels, and an endless band trained about said pulleys, and wherein the idler shaft is between the pulley on the wheel and the stub shaft, and wherein the idler shaft is mounted for swinging movement toward and away from the stub shaft, whereby when either belt is tensioned the idler shaft will be swung toward the stub shaft to loosen the other belt and the band is tensioned.

References Cited in the file of this patent

UNITED STATES PATENTS

| Number | Name | Date |
|--------|------|------|
| 2,329,372 | Hitch | Sept. 14, 1943 |
| 2,335,541 | Ronning | Nov. 30, 1943 |
| 2,408,459 | Tuttle | Oct. 1, 1946 |
| 2,453,819 | Smith | Nov. 16, 1948 |
| 2,474,524 | Hainke | June 28, 1949 |
| 2,476,526 | Badlat | July 19, 1949 |
| 2,500,168 | Du Pont | Mar. 14, 1950 |
| 2,564,586 | Smith et al. | Aug. 14, 1951 |
| 2,582,177 | Swisher et al. | Jan. 8, 1952 |
| 2,591,746 | Thom | Apr. 8, 1952 |